United States Patent

[11] 3,573,862

| [72] | Inventor | William B. Brown |
| --- | --- | --- |
| | | Rte. 1, Granby, Mo. 64844 |
| [21] | Appl. No. | 772,778 |
| [22] | Filed | Nov. 1, 1968 |
| [45] | Patented | Apr. 6, 1971 |

[54] VEHICLE WASHING APPARATUS
3 Claims, 7 Drawing Figs.

[52] U.S. Cl. ..................................... 134/57,
134/100, 134/123, 134/181
[51] Int. Cl. ..................................... B08b 3/04
[50] Field of Search ............................. 134/45,
123, 57, 58, 180, 181, 100

[56] References Cited
UNITED STATES PATENTS

| 1,183,391 | 5/1916 | Mason........................... | 134/123 |
| --- | --- | --- | --- |
| 2,703,579 | 3/1955 | Merancy ....................... | 134/123X |
| 2,708,446 | 5/1955 | Phillips........................... | 134/123X |

FOREIGN PATENTS

| 760,256 | 6/1967 | Canada ......................... | 134/123 |
| --- | --- | --- | --- |
| 1,464,763 | 11/1966 | France .......................... | 134/45 |
| 289,652 | 5/1928 | Great Britain................ | 134/123 |

*Primary Examiner*—Robert L. Bleutge
*Attorney*—Norman G. Steanson, Jr.

ABSTRACT: A pair of arcuate tracks mounted on a surface are provided. The sides and ends of the tracks define a vehicle washing position. The tracks substantially follow the top contour of the vehicle. A telescoping spray unit is operatively connected to the tracks and pivotally connected to the surface to provide a curtain of washing fluid substantially near and substantially normal to the vehicle surfaces. The spray unit substantially follows the top and side contours of the vehicle as the spray unit is moved back and forth over the vehicle. Hot wash water, cold rinse water and detergent supply means are provided. A timer operated, coin responsive, control means automatically moves the spray unit back and forth over the vehicle and sequentially supplies hot wash water-detergent mixture and cold rinse water to the spray unit.

PATENTED APR 6 1971

INVENTOR.
WILLIAM B. BROWN
BY
Norman G. Steanson Jr.
ATTORNEY

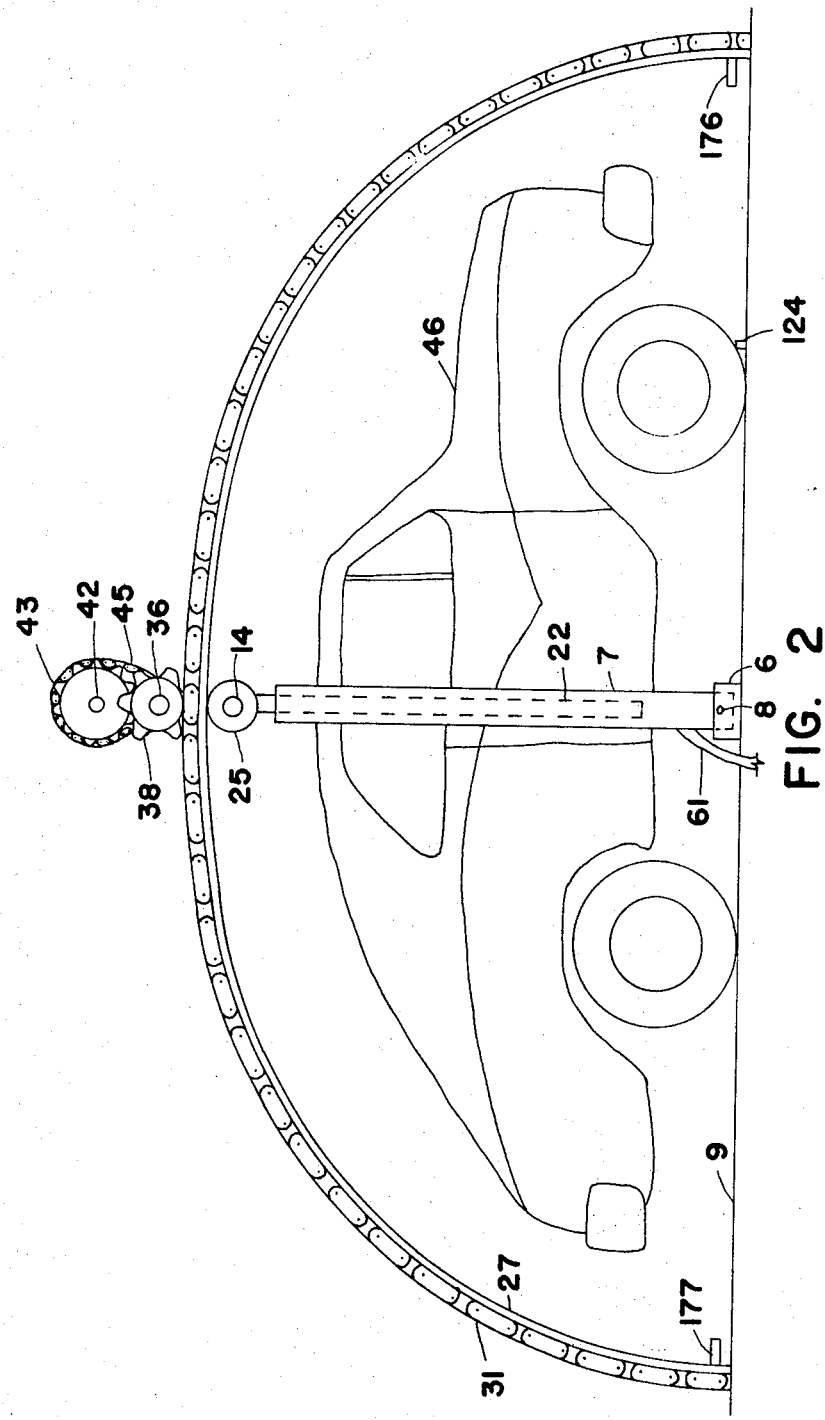

INVENTOR.
WILLIAM B. BROWN
BY
Norman G. Steanson Jr.
ATTORNEY 3,573,862

VEHICLE WASHING APPARATUS

BACKGROUND OF THE INVENTION

This invention relates to automatic vehicle washing apparatus.

In the prior art vehicle washing apparatus has been provided in which the washing sprays can be made to substantially follow the top contour of the vehicle to be washed by manual means. This invention has the advantage of having the washing sprays follow the top contour of the vehicle automatically in a new, improved, simple and economical manner.

SUMMARY OF THE INVENTION

The invention utilizes two arcuate tracks which have a contour substantially the same as the top surfaces of the vehicle to be washed. A telescoping spray unit is operatively connected at one end to the tracks and pivoted to the washing position surface at the other end. The telescoping feature allows the top sprays to follow the vehicle's top contour as the spray unit moves back and forth over the vehicle. A source of hot wash water, cold rinse water and detergent is provided. An automatic, coin responsive, timer operated, control means is provided to automatically move the spray unit back and forth over the vehicle and to automatically supply hot wash water-detergent mixture and cold rinse water to the spray unit.

It is an object of this invention to provide a new and improved vehicle washing apparatus with increased efficiency and improved operation.

Another object of this invention is to provide a vehicle washing apparatus in which the spray curtain substantially follows the top and side contours of the vehicle so that the spray curtain impinges on the car surfaces in a substantially perpendicular direction thus promoting maximum effective cleaning operation.

Another object of this invention is to provide a vehicle washing apparatus in which the washing sprays stay substantially near the vehicle top surfaces so that the spray curtain reaches the vehicle top surfaces with optimum effective force.

Another object of this invention is to provide a vehicle washing apparatus with a simple and economical fluid supply means for selectively delivering hot wash water-detergent mixture and cold rinse water to the spray unit.

Another object of this invention is to provide a vehicle washing apparatus with a simple, coin responsive, time operated control means for automatically controlling the fluid supply means and spray unit.

Other objects and advantages of this invention will become apparent from the following description taken in connection with the accompanying drawings wherein are set forth by way of illustration and example certain embodiments of this invention.

BRIEF DESCRIPTION OF THE DRAWINGS

Referring to the drawings:

FIG. 2 is a right side elevation view of the vehicle washing apparatus;

DESCRIPTION OF THE PREFERRED EMBODIMENT

Figure 1:
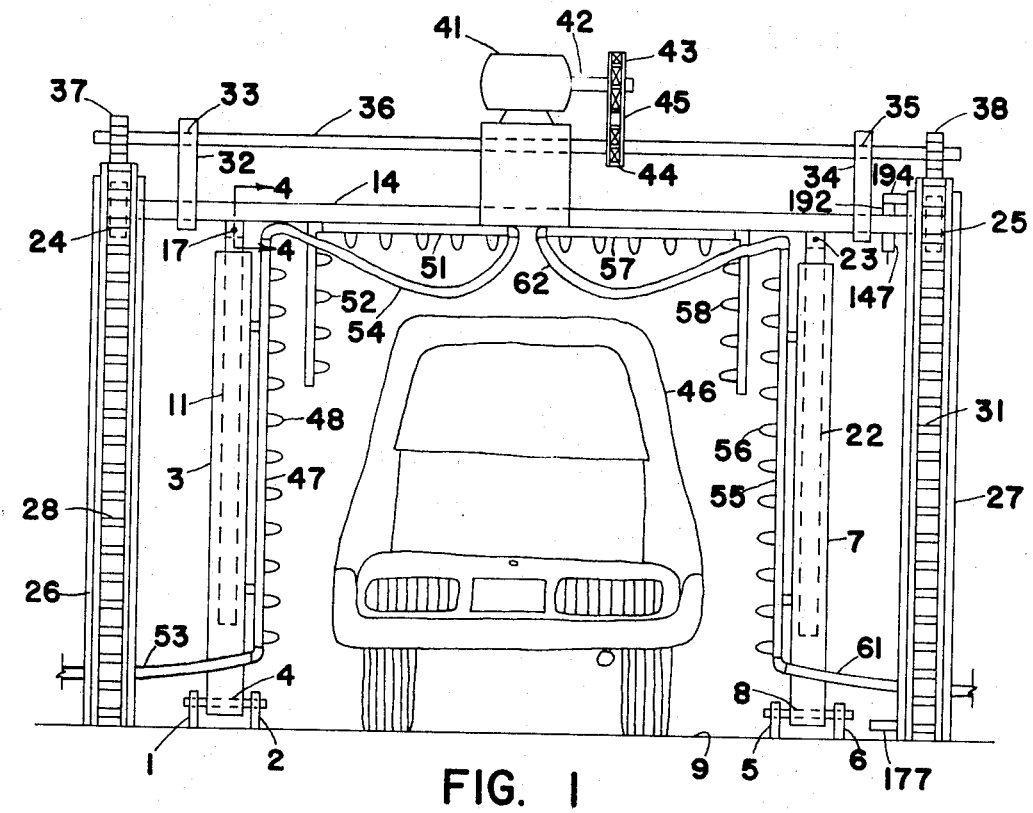
FIG. 1 is a front elevation view of the vehicle washing apparatus.
Figure 3:
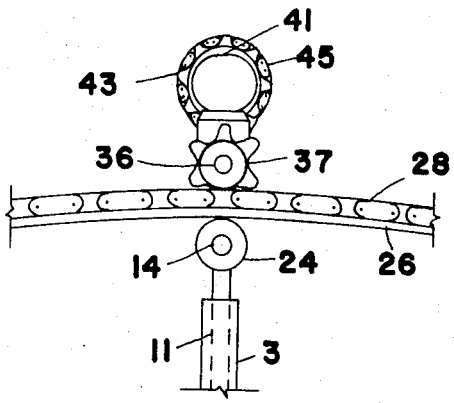
FIG. 3 is an enlarged, fragmentary left side elevation view of a portion of the vehicle washing apparatus.

In greater detail and referring to the drawings the vehicle washing apparatus comprises, first, a first bearing member 1 and a laterally disposed second bearing member 2 mounted to a surface 9. A first pipe 3 is pivotally connected to the first bearing member 1 and second bearing member 2 by first pin 4.

A third bearing member 5 is laterally disposed from second bearing member 2 a distance substantially greater than the width of the vehicles to be washed and mounted on the surface 9. A fourth bearing member 6 is further laterally disposed from the third bearing member 5 and mounted on the surface 9. A second pipe 7 is pivotally connected to the third bearing member 5 and fourth bearing member 6 by second pin 8.

First pipe 3 and second pipe 7 are substantially greater in length than the height of the vehicles to be washed.

Figure 4:
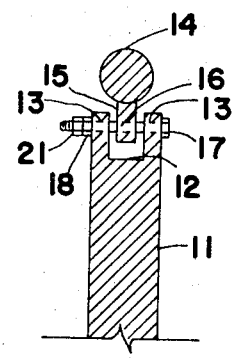
FIG. 4 is an enlarged sectional view as seen from the lines 4-4 of FIG. 1.

A third pipe 11 having a third pipe slot 12 with third pipe slot holes 13 on the outer end is slidably mounted within third pipe 3. A frame member 14 having a fifth bearing member 15 with a fifth bearing member hole 16 is pivotally connected to third pipe 11 as shown in FIG. 4. As shown in FIG. 4, the fifth bearing member 15 sets in slot 12 and the first bolt 17 is set through third pipe slot holes 13 and fifth bearing member holes 16. Nut 18 and locking nut 21 secures the first bolt 17. A fourth pipe 22 is slidably mounted in second pipe 7 and is also pivotally connected to frame member 14 as shown in FIG. 4 and as indicated at 23. A first roller 24 is rotatably mounted on one end of frame member 14 and a similar second roller 25 is rotatably mounted on the opposite end of frame member 14.

A first arcuate track 26 is mounted on the surface 9 laterally adjacent and outside the first pipe 3. The first arcuate track 26 has such a vertical contour that its arc substantially follows the top contour of the vehicles to be washed. A second arcuate track 27 is mounted on the surface 9 laterally adjacent and outside the second pipe 7 and has a vertical contour the same as the first arcuate track 26. A first chain member 28 is mounted to the top of the first arcuate track 26. A second chain member 31 is mounted to the top of the second arcuate track 27.

A seventh bearing member 32 having a seventh bearing member hole 33 is mounted to the frame 14. An eighth bearing member 34 having an eighth bearing member hole 35 is also mounted to the frame 14. A shaft 36 is rotatably mounted in the seventh bearing member hole 33 and eighth bearing member hole 35. A first sprocket 37 is mounted to one end of the shaft 36 and operatively engages the first chain member 28. A second sprocket 38 is mounted on the other end of shaft 36 and operatively engages second chain member 31. The frame member 14, seventh bearing member 32, shaft 36, first sprocket 37, and first roller 24 are so arranged that the first sprocket 37 engages the first chain member 28 and first roller 24 engages the underside of the first arcuate track 26 so that the first sprocket 37 is held engagingly in the first chain member 28 as the first sprocket 37 travels along the first chain member 28. Similarly, the frame member 14, eighth bearing member 34, shaft 36, second sprocket 38 and second roller 25 are so arranged that the second sprocket 38 engages the second chain member 31 and second roller 25 engages the underside of the second arcuate track 27 so that the second sprocket 38 is held engagingly in the second chain member 31 as the second sprocket 38 travels along the second chain member 31.

A reversible electric motor 41 having a motor drive shaft 42 is mounted substantially in the middle of frame 14. A third sprocket 43 is mounted to the motor drive shaft 42. A fourth sprocket 44 is mounted to the shaft 36 and drive chain 45 operatively couples the third sprocket 43 and fourth sprocket 44. Starting the reversible electric motor 41 causes first sprocket 37 to move along first chain member 28 and second sprocket 38 to move along second chain member 31 in a direction dependent on the direction of rotation of the reversible electric motor 41.

A car 46 is shown in the vehicle washing position.

A first spray pipe 47 is mounted to the first pipe 3. A plurality of first spray pipe nozzles 48 are operatively mounted to the first spray pipe 47. The first spray pipe nozzles are so aligned that liquid forced through the first spray pipe nozzles 48 impinges substantially normal on the side of the car 46. A closed end second spray pipe 51 having a down turned end portion is mounted to the frame member 14. A plurality of second spray pipe nozzles 52 are operatively mounted to the second spray pipe 51. The second spray pipe nozzles 52 are so aligned that liquid forced through the second spray pipe nozzles 52 impinges substantially normal on the top and the top side of the car 46. A first flexible hose 53 is operatively connected to the first spray pipe 47. The first flexible hose 53 is long enough to allow the first pipe 3 to pivot to the extreme positions the first pipe 3 can assume. A second flexible hose 54 is connected to and operatively connects the first spray pipe 47 and second spray pipe 51. The second flexible hose 54 is long enough to allow the third pipe 11 to telescope to its extreme position out of first pipe 3.

A third spray pipe 55 is mounted to the second pipe 7. A plurality of third spray pipe nozzles 56 are operatively mounted to the third spray pipe 55. The third spray pipe nozzles 56 are so aligned that liquid forced through the third spray pipe nozzles 56 impinges substantially normal on the side of the car 46. A closed end fourth spray pipe 57 having a downturned end portion is mounted to the frame member 14. A plurality of fourth spray pipe nozzles 58 are operatively mounted to the fourth spray pipe 57. The fourth spray pipe nozzles 58 are so aligned that liquid forced through the fourth spray pipe nozzles 58 impinges substantially normal on the top and top side of the car 46. A third flexible hose 61 is operatively connected to the third spray pipe 55. The third flexible hose 61 is long enough to allow the second pipe 7 to pivot to the extreme positions the second pipe 7 can assume. A fourth flexible hose 62 is connected to and operatively connects the third spray pipe 55 and fourth spray pipe 57. The fourth flexible hose 62 is long enough to allow the fourth pipe 22 to telescope to its extreme position out of second pipe 7.

In operation, starting the reversible electric motor 41 causes first sprocket 37 to move along first chain member 28 and second sprocket 38 to move along second chain member 31 in a direction dependent on the direction of rotation of reversible electric motor 41. As the first sprocket 37 and second sprocket 38 move along toward either of the ends of first chain member 28 and second chain member 31, the third pipe 11 telescopes out of first pipe 3 and fourth pipe 22 telescopes out of second pipe 7. As the first sprocket 37 and second sprocket 38 move toward the centers of the first chain member 28 and second chain member 31, the third pipe 11 telescopes into first pipe 3 and fourth pipe 22 telescopes into second pipe 7. Thus, the frame member 14 with attached second spray pipe 51 and fourth spray pipe 57 follows the contour of first arcuate track 26 and second arcuate track 27 as the reversible electric motor 41 rotates. Thus, the second spray pipe 51 and fourth spray pipe 57 substantially follow the contour of the top and top side of the car 46 to be washed.

Figure 5:
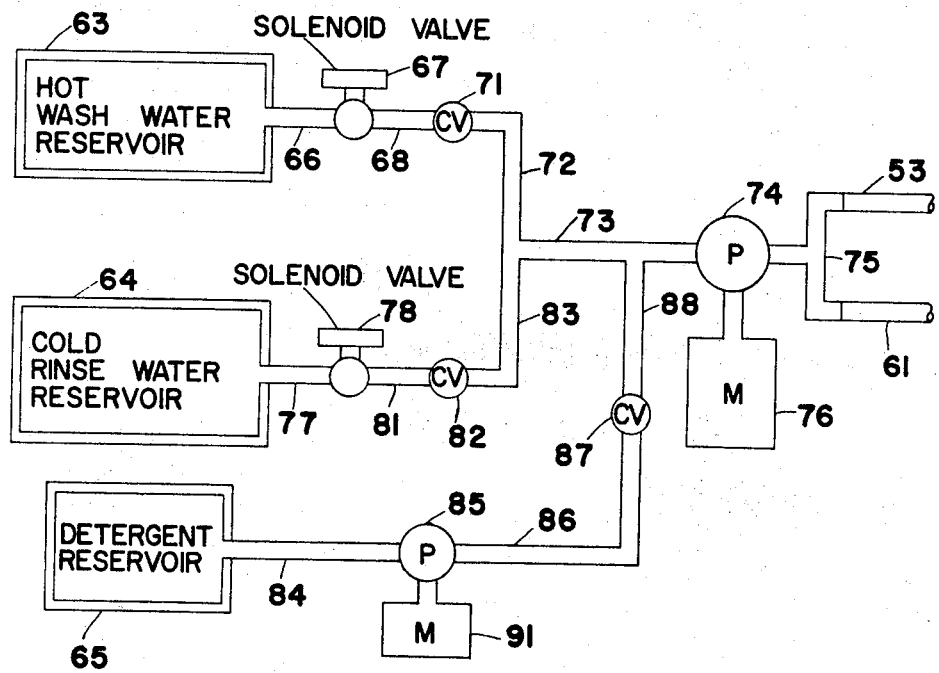
FIG. 5 is a block diagram of the fluid supply system.

A block diagram of the fluid supply system is shown in FIG. 5. The system comprises a hot wash water reservoir 63, a cold rinse water reservoir 64 and a detergent reservoir 65. The hot wash water is delivered to first flexible hose 53 and third flexible hose 61 through conduit 66, solenoid operated valve 67, conduit 68, check valve 71, conduit 72, conduit 73, liquid pump 74 and conduit 75. Thus, when solenoid operated valve 67 is energized open and liquid pump 74 is being operated by liquid pump motor 76, hot wash water is delivered to first flexible hose 53 and third flexible hose 61. Cold rinse water is delivered to first flexible hose 53 and third flexible hose 61 through conduit 77, solenoid operated valve 78, conduit 81, check valve 82, conduit 83, conduit 73, liquid pump 74 and conduit 75. Thus, when solenoid operated valve 78 is energized open and liquid pump 74 is being operated by liquid pump motor 76, cold rinse water is delivered to first flexible hose 53 and third flexible hose 61. Detergent is delivered to conduit 73 through conduit 84, detergent metering pump 85, conduit 86, check valve 87 and conduit 88. Thus, detergent is delivered to conduit 73 when detergent metering pump 85 is being operated by detergent metering pump motor 91.

Figure 7:
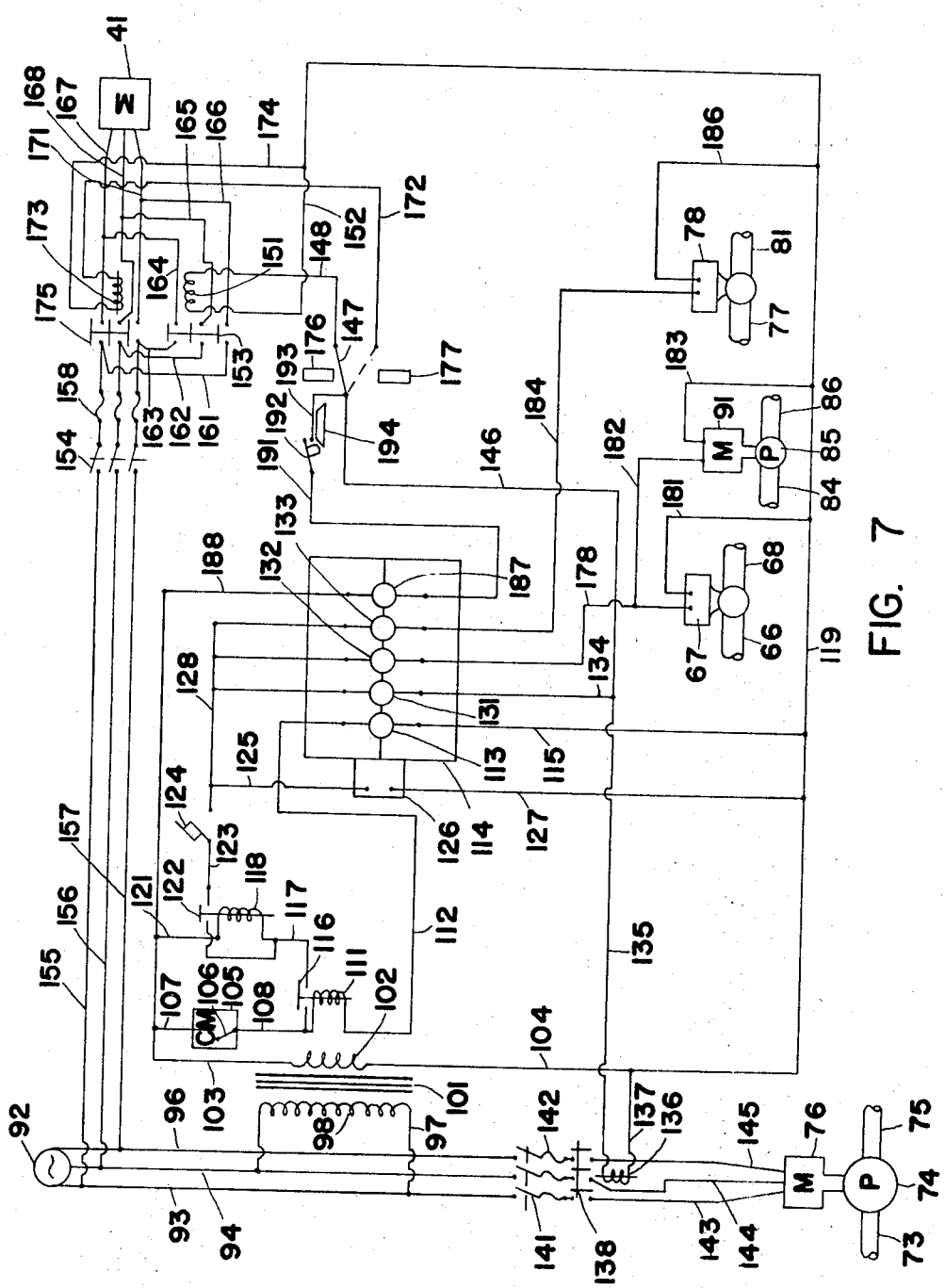
FIG. 7 is an electrical schematic diagram of the electrical control means.

The electrical control circuit is shown in detail in FIG. 7. The electrical control circuit is energized from a source of 3 phase, sixty cycle, alternating electric current 92 which flows through conductors 93, 94 and 96. Conductor 97 is connected to conductors 93 and 94 and supplies current to the primary windings 98 of step down transformer 101. Secondary winding 102 supplies stepped down single phase voltage to conductors 103 and 104.

A coin operated meter 105 is provided. When the proper combination of coins is dropped in the coin operated meter 105, the meter switch 106 closes momentarily allowing current to flow from conductor 103 through conductor 107, meter switch 106, conductor 108, relay coil 111, conductor 112, timer contact 113 of timer 114 and conductor 115 to conductor 119. Relay coil 111 is now energized closing relay switch 116 and allowing current to flow through conductor 117, relay coil 118 and conductor 121 to conductor 103. Relay coil 118 is now energized, closing relay switch 122 allowing current to flow through conductor 123 to pressure switch 124. When a car tire drives up on pressure switch 124 mounted on the surface 9 and closes the pressure switch 124, current is supplied through conductor 125, clock controlled timer motor 126 and conductor 127 to conductor 119. Timer motor 126 is now energized and the timing cycle starts. Approximately five seconds after timer motor 126 starts, timer contacts 113 open up, deenergizing relay coil 111, opening up relay switch 116 in preparation for the next cycle. When pressure switch 124 is closed, current is supplied to conductor 128 and timer contacts 131, timer contacts 132, and timer contacts 133. If pressure switch 124 is opened by driving the vehicle tire off the pressure switch 124, the system shuts down immediately as a safety precaution. Approximately 5 seconds after timer motor 126 starts, timer contacts 131 close allowing current to flow through conductor 134, conductor 135, relay coil 136, and conductor 137 to conductor 104. Energizing relay coil 136 causes relay switches 138 to close. Now, when master switch 141 is closed, current flows from conductors 93, 94 and 96 through master switch 141, suitable fuses 142, relay switches 138 and conductors 143, 144, and 145 to liquid pump motor 76 which drives liquid pump 74. When timer contacts 131 close, current is also supplied to conductor 146 and reversing switch 147. At the start of the cycle, reversing switch 147 is in the forward position so current flows through reversing switch 147 to conductor 148, relay coil 151, conductor 152 to conductor 119. Thus relay coil 151 is energized, closing relay switches 153. When relay switches 153 are closed and master switch 154 is closed, current flows from conductors 155, 156 and 157 through master switch 154, suitable fuses 158, conductors 161, 162, 163, relay switches 153, conductors 164, 165 and 166, conductors 167, 168 and 171 to reversible electric motor 41.

Reversible electric motor 41 then starts forward carrying first spray pipe 47, second spray pipe 51, third spray pipe 55 and fourth spray pipe 57 forward as described above. Reversing switch 147 is mounted on frame member 14. Reversible electric motor 41 moves forward until reversing switch 147 mounted on frame member 14 is flipped into the reversing position into contact with conductor 172 by cam 176 mounted near the forward end of second arcuate track 27. With reversing switch 147 in the reversing position, current flows through conductor 172, relay coil 173, conductor 174 to conductor 119. Thus, when reversing switch 147 is in the reversing position, relay coil 151 is deenergized and relay coil 173 is energized, which closes relay switches 175. Thus, when master switch 154 is closed, current flows from conductors 155, 156 and 157 through master switch 154, fuses 158, relay switches 175, conductors 167, 168 and 171 to reversible electric motor 41 and drives reversible electric motor 41 in the reverse direction. The reversible electric motor 41 then moves in the reverse direction until reversing switch 147 is flipped into the forward position by second cam 177 mounted near the rearward end of second arcuate track 27. The reversible electric motor 41 then moves forward as described above until reversing switch 147 is again flipped into the reversing position by first cam 176 causing the reversible electric motor 41 again to move rearward. Also, approximately 5 seconds after timer motor 126 starts timer contacts 132 close whereupon current flows through conductor 178, solenoid operated valve 67, conductor 181 to conductor 119. Thus, solenoid operated valve 67 is energized opened supplying hot wash water to liquid pump 74. Also, when timer contacts 132 close, current is supplied from conductor 178 through conductor 182, detergent metering pump motor 91 and conductor 183 to conductor 119. Thus, detergent metering pump motor 91 is energized, driving detergent metering pump 85 and supplying detergent to the liquid pump 74.

So approximately 5 seconds after timer motor 126 starts, timer contacts 131 and timer contacts 132 close which starts the liquid pump 74, opens the solenoid operated valve 67 to supply hot wash water to the liquid pump 74 and starts detergent metering pump 85 which supplies detergent to liquid pump 74, and starts reversible electric motor 41 moving forward. So now a mixture of detergent and hot wash water is being sprayed on the car 46 and the spray curtain is moving forward. The spray curtain moves forward over the car 46 until reversing switch 147 on frame member 14 is flipped into reverse by first cam 176. The reversible electric motor 41 then reverses and the spray curtain is moved rearward completely covering the car with hot water and detergent. When the spray curtain has covered the car 46 completely from front to back, reversing switch 147 is flipped into the forward position by second cam 177 and the reversible electric motor 41 is again reversed, driving the spray curtain forward again. Now, as the spray curtain moving forward reaches the center of first arcuate track 26 and second arcuate track 27, timer contact 132 opens up and timer contact 133 closes. When timer contact 132 opens up, current is interrupted to solenoid operated valve 67, shutting off hot wash water flow to the liquid pump 74 and current is also interrupted to detergent metering pump motor 91 shutting off detergent flow to liquid pump 74. Closing timer contact 133 supplies current through conductor 184, solenoid operated valve 78, conductor 186 to conductor 119. Solenoid operated valve 78 is now energized open and cold rinse water is now supplied to liquid pump 74 and first spray pipe 47, second spray pipe 51, third spray pipe 55 and fourth spray pipe 57 providing a cold water rinsing spray curtain to the car 46. The rinsing spray curtain moves on forward to cover the forward half of the car 46 whereupon reversing switch 147 is flipped into the reversing position by first cam 176 and the cold water rinsing spray curtain is then moved rearward to cover the car entirely from front to rear. When the rinsing spray curtain reaches its most rearward position reversing switch 147 is again flipped into the forward position by second cam 177 and the rinsing spray curtain again moves forward. As the spray curtain substantially approaches the middle of the first arcuate track 26 and second arcuate track 27, timer contact 187 closes supplying current from conductor 188 through timer contact 187, conductor 191, normally closed switch 192, and conductor 193 to reversing switch 147 which is in the forward position. A few seconds after timer contact 187 closes, timer contact 131 opens up cutting off current to the liquid pump motor 76 and the reversing switch 147 through conductor 146 and timer contact 133 opens up cutting off current to solenoid operated valve 78 which shuts off the cold rinse water flow. Although current is now cut off to reversing switch 147 through timer contact 131, timer contact 187 is closed allowing current to flow through reversing switch 147 so the reversible electric motor 41 continues to run. The normally closed switch 192 is located on the frame member 14. A third cam 194 is located exactly in the middle of the second arcuate track 27 and is so positioned that it opens normally closed switch 192 each time normally closed switch 192 passes under the third cam 194. So the reversible electric motor 41 continues to run moving the frame member 14 forward until the frame member 14 reaches the exact center of the second arcuate track 27 whereupon third cam 194 actuates normally closed switch 192 open cutting off current to the reversing switch 147 which shuts off current to the reversible electric motor 41. This combination is used to insure that the reversible electric motor 41 stops when the frame member 14 is in the exact center of second arcuate track 27 at the end of the cycle even if the timer contact 131 opens before the frame member 14 reaches the center of second arcuate track 27.

About 5 seconds before timer contact 131 and timer contact 133 open up, timer contact 113 closes so the circuit will be ready for the next cycle. About 5 seconds after the frame member 14 and first pipe 3 and second pipe 7 stop in the vertical position timer motor 126 cuts off. Timer motor 126 is clock controlled and automatically resets in preparation for the next cycle.

Figure 6:
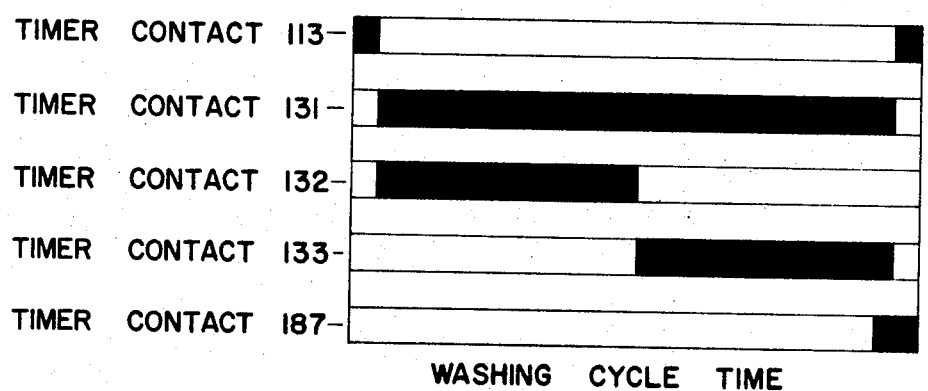
FIG. 6 is a diagrammatic representation of the time the five timer contacts of the timer are open and closed during the washing cycle wherein washing cycle time is plotted on a horizontal base and timer contacts are shown as horizontal bars and wherein the black portions of the bars indicate the timer contact is closed and the white portion of the bar indicates the timer contact is open.

FIG. 6 illustrates the timing sequence of timer contacts 113, 131, 132, 133 and 187. After suitable coins have been deposited in coin operated meter 105 and pressure switch 124 is closed, clock controlled timer motor 126 starts and the cycle begins. Timer contact 113 is closed before the cycle starts so that current may be supplied to pressure switch 124 when suitable coins are deposited in coin operated meter 105 and stays closed for about 5 seconds after the timing cycle starts. Whereupon, timer contact 113 opens up deenergizing relay coil 111 which causes relay switch 116 to open up. About 5 seconds before the end of the cycle, timer contact 113 again closes in preparation for the next cycle. Also about 5 seconds after the cycle starts, timer contact 131 closes which starts the liquid pump motor 76 and the reversible electric motor 41. Also about 5 seconds after the cycle starts, timer contact 132 closes supplying current to and opening solenoid operated valve 67 and starting detergent metering pump motor 91 which causes a hot wash water-detergent spray curtain to be supplied to the car 46. As the reversible electric motor 41 is traveling forward the second time and the hot wash water and detergent spray curtain reaches the middle of the first arcuate track 26 and second arcuate track 27, timer contact 132 opens and timer contact 133 closes which closes solenoid do operated valve 67 and shuts off current to detergent metering pump motor 91 and supplies current to solenoid operated valve 78 which causes solenoid operated valve 78 to open causing a cold water rinsing spray curtain to be supplied to the car 46. As the cold water rinsing spray is moving forward the second time, timer contact 187 closes a few seconds before the cold water rinsing spray reaches the center of first arcuate track 26 and second arcuate track 27 so that current is still supplied to reversible electric motor 41 to keep the frame member 14 moving forward to the center of the first arcuate track 26 and second arcuate track 27 even though timer contact 131 opens up before frame member 14 reaches the exact center of first arcuate track 26 and second arcuate track 27. As the cold water rinsing spray reaches the center of the first arcuate track 26 and second arcuate track 27, timer contacts 131 and 133 open up interrupting current to the liquid pump motor 76, the reversible electric motor 41 and the solenoid operated valve 78 causing the solenoid operated valve 78 to close. Thus, the cold water rinsing spray is cut off and the frame member 14 is stopped in the center of first arcuate track 26 and second arcuate track 27. About five seconds after timer contacts 131 and 133 open up, clock operated timer motor 126 cuts off and automatically resets in preparation for the next cycle. This ends the complete cycle.

The complete cycle will now be described broadly and briefly.

A customer deposits the correct coins in coin operated meter 105 causing meter switch 106 to close momentarily causing current to be supplied to pressure switch 124. The car 46 is then driven into the car washing position whereupon the tire of the car 46 contacts and presses closed pressure switch 124 which supplies current to and starts clock controlled timer motor 126 which starts the washing cycle. About 5 seconds later, timer contacts 131 and 132 close which starts the liquid pump motor 76 and starts reversible electric motor 41 to start and move forward. Closing timer contact 132 supplies current to solenoid operated valve 67 and detergent metering pump motor 91 so a mixture of hot wash water and detergent is supplied to the first spray pipe 47, second spray pipe 51, third spray pipe 55 and fourth spray pipe 57. Thus, a hot water-detergent spray curtain is sprayed on the car 46. The hot wash water-detergent spray curtain moves forward over the car 46 until the spray curtain reaches the maximum down and forward position where the reversing switch 147 contacts first cam 176 whereupon reversing switch 147 is flipped into the reverse position by first cam 176. The reversible electric motor 41 then reverses and moves the hot wash water-detergent spray curtain rearward completely covering the car 46 from front to back. When the spray curtain reaches the maximum down and rearward position reversing switch 147 is flipped into the forward position by second cam 177 and reversible electric motor 41 reverses and moves the spray curtain forward again. As the spray curtain reaches the middle of first arcuate track 26 and second arcuate track 27, timer contact 132 opens up and timer contact 133 closes interrupting current flow to solenoid operated valve 67 and detergent metering pump motor 91 and supplying current to and opening solenoid operated valve 78. Thus hot wash water-detergent flow is cut off and cold rinse water is supplied to first spray pipe 47, second spray pipe 51, third spray pipe 55 and fourth spray pipe 57. The cold rinse water spray curtain moves forward until reaching the maximum full down and forward position where reversing switch 147 is flipped into the reverse position by first cam 176. The cold water rinse curtain then moves rearward completely covering the car 46 from front to back until the spray curtain reaches the maximum down and rearward position whereupon reversing switch 147 is flipped into the forward position by second cam 177. Thus the reversible electric motor 41 is again reversed to move the cold water rinsing spray curtain forward. A few seconds before the rinse spray curtain reaches the center of first arcuate track 26 and second arcuate track 27, timer contact 187 closes supplying current to normally closed switch 192. Thus current is supplied to reversing switch 147 to keep the frame member 14 and reversible electric motor 41 moving forward to the exact center of the first arcuate track 26 and second arcuate track 27 in case timer contact 131 opens up before the frame member 14 and reversible electric motor 41 reach the center of first arcuate track 26 and second arcuate track 27. Third cam 194 located on the second arcuate track 27 will force normally closed switch 192 open as the frame member 14 and reversible electric motor 41 reach the center of second arcuate track 27 interrupting current to the reversible electric motor 41 causing the frame member 14 and reversible electric motor 41 to stop in the center of second arcuate track 27. Timer contact 187 stays closed to the end of the cycle. Normally, as the cold water rinsing spray curtain reaches the center of second arcuate track 27, timer contacts 131 and 133 open up interrupting current to the liquid pump motor 76, reversible electric motor 41 and solenoid operated valve 78. Thus, the cold water rinsing spray curtain is shut off and the reversible electric motor 41 stops. About 5 seconds after timer contacts 131 and 133 open up, clock controlled timer motor 126 stops and the timer motor 126 automatically resets to be ready for the next cycle. Thus the washing cycle is complete and the vehicle washing apparatus is ready for the next washing cycle.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. A vehicle washing apparatus which comprises:

a. a first arcuate track and a second arcuate track mounted on a surface and defining a vehicle washing position and having contours substantially the same as the contour of the top surfaces of the vehicle to be washed;
b. a first chain member and a second chain member mounted on the top surfaces of the first arcuate track and second arcuate track respectively;
c. a movable, telescoping inverted U-shaped spray unit pivotally mounted to the surface;
d. a first roller and second roller rotatably mounted to the spray unit and engaging the underside of the first arcuate track and second arcuate track respectively;
e. a first sprocket and a second sprocket rotatably mounted on the spray unit and operatively engaging the first chain member and second chain member respectively;
f. a reversible drive motor mounted on the spray unit;
g. a drive connecting means operatively connecting the reversible drive motor and the first sprocket and second sprocket so that rotation of the reversible drive motor causes the first sprocket and second sprocket to travel back and forth along the first chain member and second chain member, causing the top portions of the spray unit to telescope in and out of the lower portions of the spray unit so that the top portions of the spray unit follow the contour of the first arcuate track and second arcuate track as the reversible drive motor rotates in either direction;
h. a fluid supply means for supplying hot wash water-detergent mixture and rinse water to the spray unit.

2. A vehicle washing apparatus which comprises:

a. a first arcuate track and a second arcuate track mounted on a surface and defining a vehicle washing position and having contours substantially the same as the top surfaces of the vehicle to be washed;
b. a first chain member and second chain member mounted on the first arcuate track and second arcuate track respectively;
c. a first pipe and second pipe pivotally mounted to the surface inside and adjacent the first arcuate track and second arcuate track respectively;
d. a third pipe and fourth pipe slidably mounted in the first pipe and second pipe respectively so that the third pipe and fourth pipe can telescope in and out of the first pipe and second pipe;
e. a frame member pivotally mounted to the ends of the third pipe and fourth pipe;
f. a first roller and second roller rotatably mounted to the ends of the frame member and engaging the underside of the first arcuate track and second arcuate track respectively;
g. a pair of bearing members having bearing member holes mounted substantially near the ends of the frame member;
h. a shaft rotatably mounted in the bearing member holes;
i. a first sprocket and second sprocket mounted on the ends of the shaft and operatively engaging the first chain member and second chain member respectively;
j. a reversible electric motor mounted on the frame member;
k. a drive connecting means operatively engaging the reversible electric motor and the shaft so that rotation of the reversible electric motor causes the first sprocket and second sprocket to travel along the first chain member and second chain member in a direction dependent on the direction of rotation of the reversible electric motor;
l. a first spray pipe mounted on the first pipe and a closed end second spray pipe mounted on the frame member and a flexible hose operatively connecting the first spray pipe and second spray pipe;
m. a third spray pipe mounted on the second pipe and a closed end fourth spray pipe mounted to the frame member and a flexible hose operatively connecting the third spray pipe and fourth spray pipe;

n. a plurality of spaced spray nozzles operatively mounted to the first spray pipe, second spray pipe, third spray pipe and fourth spray pipe so that liquid forced through the nozzles forms a spray curtain that impinges substantially normal on the vehicle surfaces of a vehicle in a vehicle washing position;

o. fluid supply means for supplying hot wash water-detergent mixture and rinse water to the first spray pipe and second spray pipe.

3. An automatic vehicle washing apparatus which comprises:

a. a first arcuate track and a second arcuate track mounted on a surface and defining a vehicle washing position and having contours substantially the same as the contours of the top surfaces of the vehicle to be washed;

b. a first chain member and a second chain member mounted on the top surfaces of the first arcuate track and second arcuate track respectively;

c. a movable, telescoping inverted U-shaped spray unit pivotally mounted to the surface;

d. a first roller and second roller rotatably mounted to the spray unit and engaging the underside of the first arcuate track and second arcuate track respectively;

e. a first sprocket and a second sprocket rotatably mounted on the spray unit and operatively engaging the first chain member and second chain member respectively;

f. a reversible electric motor mounted on the spray unit.

g. a drive connecting means operatively connecting the reversible electric motor and the first sprocket and second sprocket so that rotation of the reversible motor causes the first sprocket and second sprocket to travel back and forth along the first chain member and second chain member causing the top portions of the spray unit to telescope in and out of the lower portions of the spray unit so that the top portions of the spray unit follow the contour of the first arcuate track and second arcuate track as the reversible electric motor rotates in either direction;

h. a liquid pump having an output operatively connected to the spray unit and an input adapted to be connected to a source of hot wash water, cold rinse water and detergent;

i. a liquid pump motor operatively connected to the liquid pump and an energization source for driving the liquid pump;

j. a first solenoid valve operatively connected between the output of the hot wash water source and the input of the liquid pump for providing hot wash water to the liquid pump when energized;

k. a second solenoid operated valve operatively connected between the output of the cold rinse water source and the input of the liquid pump for providing cold rinse water to the liquid pump when energized;

l. a detergent metering pump operatively connected between the output of the detergent source and the input of the liquid pump for providing detergent to the liquid pump;

m. a detergent metering pump motor operatively connected to the detergent metering pump for driving the detergent metering pump when energized;

n. a timer including a clock controlled timer motor for sequentially and in timed relationship energizing the clock controlled timer motor by a first timer contact, energizing the liquid pump motor and the reversible electric motor through a second timer contact, energizing the first solenoid operated valve and detergent metering pump motor through a third timer contact, and energizing the second solenoid operated valve through a fourth timer contact;

o. a coin operated meter;

p. means including an electrical circuit responsive to receipt of suitable coins in the coin operated meter for energizing the clock controlled timer motor, the first timer contact, the second timer contact, the third timer contact, and the fourth timer contact and for resetting the control means to the starting position at the end of the washing cycle;

q. reversible electric motor reversing means including a first cam and a second cam located at opposite ends of the second arcuate track for flipping a reversing switch mounted on the spray unit into opposite positions as the spray unit reaches the first cam and second cam for reversing the reversible electric motor;

r. stopping means including a normally closed switch mounted on the spray unit and electrically connected to a fifth timer contact and a third cam mounted on the center of the second arcuate track for opening the normally closed switch as the normally closed switch passes over the third cam for stopping the reversible electric motor in the center of the second arcuate track at the end of the washing cycle.